Figure 1:
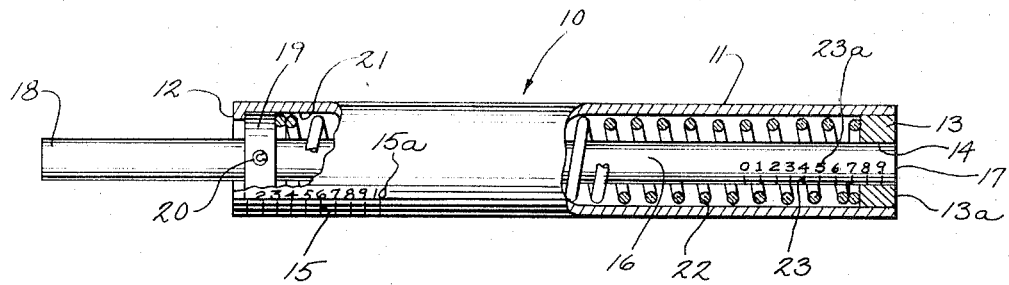

United States Patent [19]
Casper

[11] 3,839,908
[45] Oct. 8, 1974

[54] BELT TENSION GAGE

[76] Inventor: William Paul Casper, Rt. 4, Fond du Lac, Wis. 54935

[22] Filed: Dec. 8, 1972

[21] Appl. No.: 313,536

[52] U.S. Cl.............................. 73/144, 73/141 AB
[51] Int. Cl. ........................................... G01l 5/06
[58] Field of Search............ 73/144, 141 AB, 81, 78

[56] References Cited
UNITED STATES PATENTS

| | | |
|---|---|---|
| 1,380,251 | 5/1921 | Riba..................................... 73/144 |
| 1,833,195 | 11/1931 | Albright, Jr........................... 73/144 |
| 2,384,437 | 9/1945 | Boynton .................. 73/141 AB UX |
| 2,446,956 | 8/1948 | Ross....................................... 73/81 |
| 2,450,188 | 9/1948 | DeGraaf......................... 73/141 AB |
| 2,622,439 | 12/1952 | Copper................................... 73/80 |
| 3,482,442 | 12/1969 | Howard ............................... 73/144 |

*Primary Examiner*—Charles A. Ruehl
*Attorney, Agent, or Firm*—Harold E. Stohlgren

[57] ABSTRACT

A belt tension gage for use with a wide variety of flexible drive belt transmissions including those in which the belt is relatively inaccessible.

5 Claims, 3 Drawing Figures

BELT TENSION GAGE

DESCRIPTION OF THE DISCLOSURE

This invention relates to a hand gage for use in measuring tension in flexible drive belt power transmissions. There are a number of gages disclosed in prior patents for measuring tension in flexible drive belts. However, these prior gages have limited use in many modern belt drives because they require that a substantial area of the drive be exposed. Many present day drives are protected with covers that may be difficult to remove or the drive may be relatively inaccessible. I have also found that gages presently available check deflection over a relatively short span of the belt and are inherently inaccurate. The following United States patents are representative of the prior art with which I am acquainted. They include: U.S. Pat. Nos. 1,031,208; 1,380,251; 1,650,603; 2,450,188; and 3,352,153.

Present day belt drive transmissions require that the belt tension be adjusted so as to take into consideration, belt life, life of bearings supporting belt sheaves, and noise level. There is in most belt drives an optimum belt tension that will satisfy the above three specifications.

The present invention overcomes the shortcomings of the prior art gages and provides a more satisfactory and efficient means of adjusting belt drive transmissions for improved operation.

With above in mind, one object of the invention is to provide a belt tension gage which can be used in machines where the drive is relatively inaccessible, such as when protected by guards or hidden behind other structures in a compact machine assembly.

Another object of the invention is to provide a belt tension gage that is universally applicable to a wide variety of drive belt transmissions.

Another object of the invention is to provide a belt tension gage that is highly accurate and is relatively inexpensive to manufacture.

Another object of the invention is to provide a belt tension gage in which actual belt deflection is directly indicated.

Figure 3:
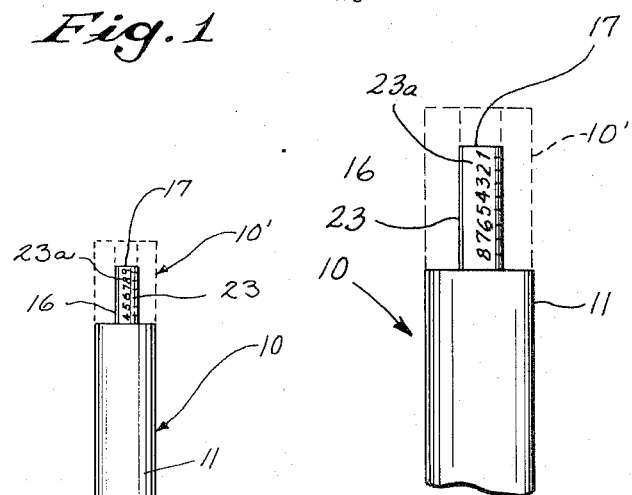
Figure 2:
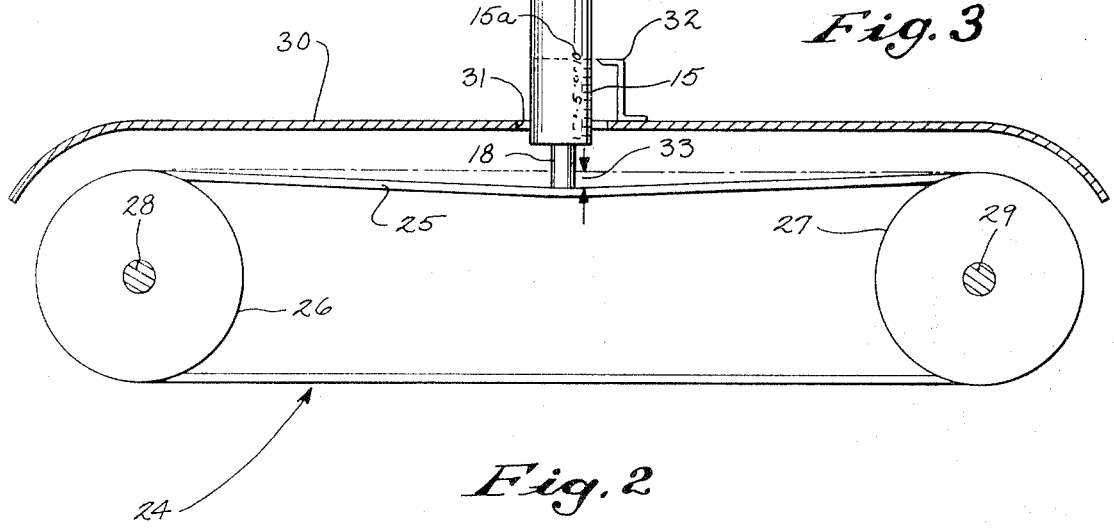

Referring to the drawings; FIG. 1 is a side elevation view of my gage partially in section. FIG. 2 is an elevation view of my gage shown in place for checking a belt drive transmission assembly. FIG. 3 is a partial elevation view showing an alternate form of my invention.

With reference to the drawings, the gage 10 has a tubular housing 11, one end of which is formed with an inwardly facing annular flange 12. A cylindrical disc 13, formed with a central aperture 14, has a press fit within the other end of the housing. The outer surface of the housing is marked with a scale 15 which is graduated in tenths of an inch along the axis of the housing originating from the flange end thereof. Indicia 15a in the form of numbers 1–10, identify the scale graduations. A stem 16 is retained within the housing 11 for relative axial movement therein. One end 17 of the stem extends through and is slidably supported in the aperture 14 of the disc 13. The other end of the stem includes an extension 18 and a cylindrical piston 19 fixedly attached to the stem co-axially thereof by a diametrically located pin 20. The piston is slidably supported on the inner wall 21 of the housing, and its travel in one direction is limited by the flange 12. The one end 17 of the stem 16 is adapted to be flush with the outer face 13a of the disc 13 when the piston 19 is in engagement with the flange 12. The end 17 of the stem is marked with a scale 23 having graduations spaced axially thereof one tenth of an inch apart and with indicia 23a comprising numbers 9–0 starting from the outer face of the stem end 17.

A compression spring 22 is supported within the housing 11 between the piston 19 and the end disc 13 biasing the piston toward engagement with the flange 12 and causing the extension 18 of the stem to normally protrude beyond the flange end of the housing and the stem end 17 to be flush with the outer face 13a of the disc 13.

FIG. 2 represents a typical flexible belt drive transmission assembly 24 which includes at least one continuous belt 25 mounted on sheaves 26 and 27 which are in turn carried by shafts 28 and 29 respectively. As is the usual practice, a rigid sheetmetal guard 30 covers a normally exposed expanse of the belt transmission to meet safety requirements and for protecting the transmission from dirt and oil. For purposes of the present description, the guard 30 is formed with an access aperture 31 located directly above the belt 25 and midway between the sheaves 28 and 29. An index or reference pointer 32 is attached to the guard adjacent the aperture 31. A hand held scale can be substituted for the pointer as will become readily apparent from the following explanation covering use of the gage.

The scales 15 and 23 are numbered to provide direct reading on scale 23 of the actual amount of deflection 33 of the belt 25 when the housing 11 is moved by hand one full inch toward the belt using pointer 32 or a hand held scale as a reference, after initial contact of the extension 18 end of the stem 16 with the belt. Testing belt tension requires that the gage 10 be located so that the extension end 18 contacts the belt midway between sheaves 28 and 29 with the axis of the gage substantially perpendicular to the belt longitudinal axis. After initial contact of the extension 18 with the belt, the housing 11 is manually urged in the direction of the belt a distance of one inch against the bias of the spring 22. The amount of actual belt deflection is then read directly from scale 23. As shown in FIG. 2, the indicia 23a of the scale 23 reads inversely to the amount of projection of the stem beyond the disc 13. It therefore, registers directly the amount of belt deflection. The dotted outline 10' of the gage as shown in FIG. 2 represents the initial contact position of the gage and the belt. The solid lines represent the positions of the gage and the belt after the housing 11 has been moved one inch as shown by the scale 15 and marker 32. The amount of belt deflection 33 is registered directly as 3 inches on the scale 23. Each type and size of flexible drive belt transmission will have an optimum belt deflection specification for the above mentioned one inch standard movement of housing 11. This optimum deflection can be set forth in charts or tables for reference purposes, or the user can establish his own specification to suit special applications.

My gage can be modified to suit belt transmissions where less than one full inch of movement of the housing is desirable. If the indicia 23a of scale 23 are inverted in their order as shown in FIG. 3 so that they read 1–10 starting from the end 17, then actual belt deflection for any amount of movement of the housing will be equal to the movement of the housing as indicated by scale 15 less the reading of scale 23.

My gage is also useful for checking belt transmissions that have no cover or where it is desirable to adjust the belt tension prior to installing the cover. In those applications, it is only necessary to establish a temporary stationary reference marker by which a predetermined amount of axial movement of the housing 11 can be applied from the point of initial contact of the extension 18 with the midpoint of the belt span.

I claim as my invention:

1. A hand gage for measuring tension in a belt drive transmission comprising; a tubular housing formed with an inwardly facing abutment at one end and a reduced aperture at the other end and adapted to be moved axially for applying a deflecting force to the belt, a stem formed with a piston and supported for reciprocation coaxially within the housing with one end projecting therefrom for contact with the belt and the other end projecting through the aperture and formed with an axially graduated scale associated with the other end of the housing as an index for indicating the amount of relative movement between the housing and stem, a spring supported within the housing between the piston and apertured end biasing the piston axially into engagement with the abutment and reference means formed axially along the housing for measuring the amount of housing movement relative to a fixed reference on the transmission representing the undeflected position of the belt when the housing is manually urged in the direction of the belt against the bias of the spring.

2. A hand gage for measuring tension in a belt drive transmission according to claim 1 wherein the reference means on the tubular housing is a scale graduated and numbered into equal parts of an inch and the scale on the stem is graduated and numbered into equal parts of an inch with the numbers inverted relative to the numbers on the housing, whereby belt deflection for a given movement of the housing is obtained by subtracting the reading of the stem scale from that of the housing scale.

3. A hand gage for measuring tension in a belt drive transmission according to claim 1, wherein the scale graduations on the stem are numbered in the order of increasing magnitude from the belt contact end of the stem so that belt deflection is read directly from the scale on the stem.

4. A hand gage for measuring tension in a belt drive transmission according to claim 1 wherein the abutment is an annular flange, and a disc fixed within the housing forms the aperture for supporting the stem and the reference for the scale of the stem.

5. A hand gage for measuring tension in a belt drive transmission according to claim 1 wherein the tubular housing and the stem assembly have a relatively small diameter and extension for use in belt drive transmissions protected by covers or otherwise relatively inaccessible.

* * * * *